(12) United States Patent
Balaban

(10) Patent No.: US 6,459,458 B1
(45) Date of Patent: Oct. 1, 2002

(54) DIGITAL AUTOMATIC GAIN CONTROL, AS FOR A RECEIVER

(75) Inventor: Alvin Reuben Balaban, Lebanon, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/333,402

(22) Filed: Jun. 15, 1999

Related U.S. Application Data

(63) Continuation-in-part of application No. 09/311,252, filed on May 13, 1999.

(51) Int. Cl.[7] .............................................. H04N 5/52
(52) U.S. Cl. ................... 348/678; 348/725; 455/232.1; 455/234.1; 375/345
(58) Field of Search ................... 348/678–686, 348/528, 572, 555, 725, 726, 731–733, 735; 455/232.1, 234.1, 234.2, 355; 375/345; H04N 5/52

(56) References Cited

U.S. PATENT DOCUMENTS

| | | | | |
|---|---|---|---|---|
| 4,989,074 A | * | 1/1991 | Matsumoto | 348/572 |
| 5,563,916 A | * | 10/1996 | Scarpa | 375/345 |
| 5,917,372 A | * | 6/1999 | Kakura et al. | 330/129 |
| 6,195,133 B1 | * | 2/2001 | Bae | 348/572 |

* cited by examiner

Primary Examiner—Michael H. Lee
(74) Attorney, Agent, or Firm—William J. Burke

(57) ABSTRACT

A digital AGC arrangement is responsive to the absolute value of a digital signal whose amplitude is to be gain controlled to generate an error signal. The digital value of the error signal is converted to an analog signal by a high-gain digital element such as a pulse width modulator or a comparator controlling a current source. The output thereof is filtered and applied to the gain control input of an amplifier whose gain is to be controlled thereby. This AGC is useful, for example, in a television receiver that includes an RF tuner, IF SAW filter and IF amplifier to receive television signals in both analog format, such as the NTSC, PAL and SECAM formats, and in digital format, such as the ATSC and DVB formats. IF signals from the IF amplifier are sub-sampled to digital signal form and are utilized for AGC, in addition to being processed by respective analog format and digital format processors.

31 Claims, 3 Drawing Sheets

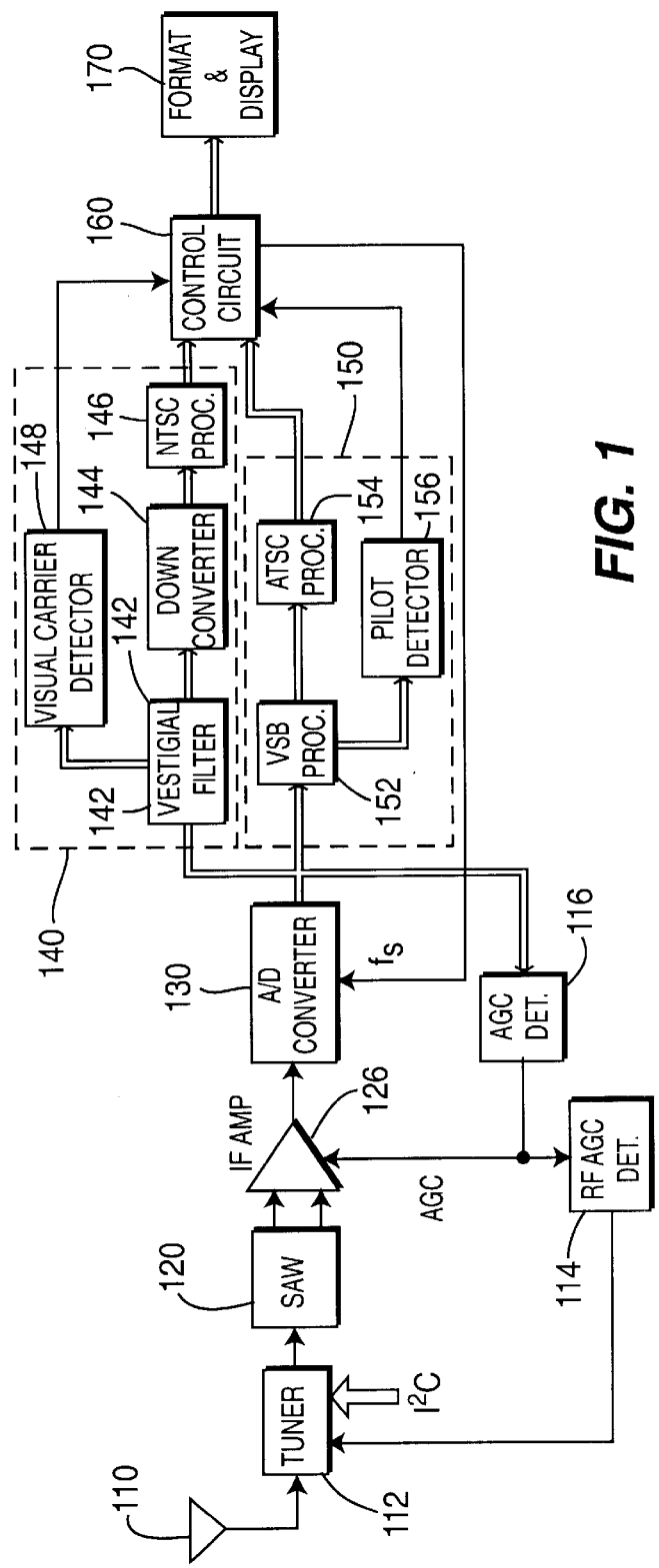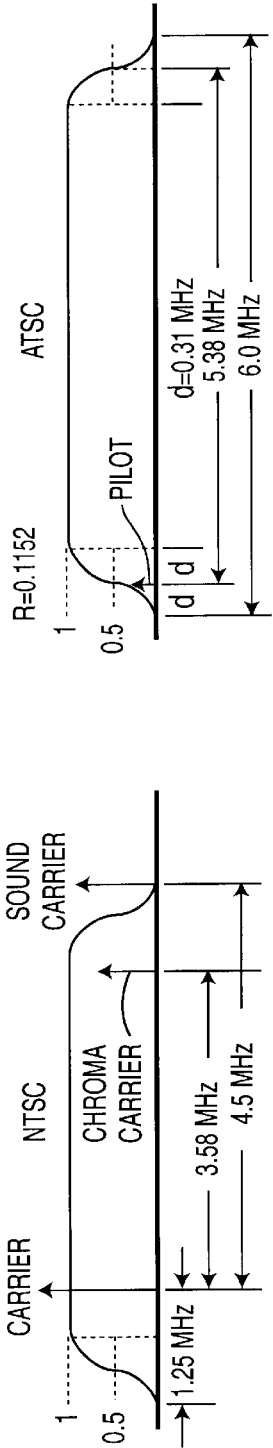
FIG. 1
FIG. 2A
FIG. 2B

DIGITAL AUTOMATIC GAIN CONTROL, AS FOR A RECEIVER

This is a continuation-in-part of U.S. patent application Ser. No. 09/311,252 entitled "RECEIVER FOR ANALOG AND DIGITAL TELEVISION SIGNALS" filed May 13, 1999.

The present invention relates to gain control and, in particular, to a digital gain control.

For over half a century, television signals have been broadcast in accordance with standardized analog signal formats, such as the NTSC format in the United States, the PAL format in Europe, and the SECAM format in France. Analog television signal formats have inherent limitations that preclude further improvement of picture quality, however, those inherent limitations can be overcome by broadcasting television signals in a digital format. Happily, advances in the design and processing of digital integrated circuits of ever increasing complexity and capability has resulted in sophisticated digital signal processing becoming available in a practical form and at reasonable cost.

Present digital television signal broadcast formats include the Digital Video Broadcast (DVB) format in use in Europe and the Advanced Television Standards Committee (ATSC) formats, such as ATSC format A/53 in use in the United States. Unfortunately, the various systems proposed and/or adopted for transmission of television signals in digital format are not compatible with the existing processing of television signals in analog format. This incompatibility arises not only because one format is analog and the other digital, but also because the signal processing at radio frequencies (RF) and/or at intermediate frequencies (IF) required to properly receive the formats are also different, such as in required filtering. Filtering at IF is typically implemented in surface acoustic wave (SAW) filters and SAW filters for NTSC signals should have a vestigial-sideband filter characteristic and those for ATSC signals should have a root-cosine filter or a "roofing" (flat) filter characteristic.

The conventional approach to a receiver for receiving television signals in both analog and digital formats have required dual SAW filters and typically dual IF amplifiers, one set for each format, thereby undesirably increasing the complexity and cost of the television receiver and possibly introducing electrical interference. Such prior art arrangements typically employ the same conventional analog automatic gain control (AGC) as is employed in conventional analog format receivers. Such receivers often include two separate analog-to-digital (A/D) converters, one for the analog format signals and one for the digital format signals. Unfortunately, such analog AGC and duplicative circuitry also adds undesirable cost and complexity to the receiver which is coming to include increasing digital processing and control functions.

In the United States, for example, the change over from all-NTSC analog format broadcasting to all-ATSC digital format broadcasting will be phased in gradually over many years so as not to instantly obsolete the installed base of existing NTSC television transmitters and receivers. Initially, only a few of the available programs may be in digital format and only a few of the broadcast channels will be changed from NTSC analog format to ATSC digital format, and later additional programs and channels will be converted. This suggests a further problem in that the conventional fixed analog AGC does not respond to the particular attributes of ATSC and NTSC formatted signals in view of the unknown and unpredictable program and channel broadcast patterns in any particular geographical area.

Accordingly, there is a need for a receiver having a digital gain control. In addition, it is desirable that such receiver receive both analog format and digital format signals and, if necessary, adapt the gain control characteristics responsive to the received signal, for example, whether the received signal is in analog format or in digital format.

To this end, a gain control according to the present invention comprises means for converting an output signal from a gain-controllable circuit into digital data and a first digital comparator comparing a representation of the magnitude value of the digital data to a digital reference value to produce a digital error value. A generator generates an output signal responsive to the digital error value, and a low-pass filter responsive to the output signal applies a gain control signal to the gain-controllable circuit.

According to another aspect of the present invention, a method of controlling the magnitude of a signal provided by a controllable circuit comprises:

converting the signal magnitude to a sequence of digital words;

comparing a representation of the magnitude value of the digital words to a digital reference value to provide a digital error value;

generating an output signal responsive to the digital error value;

filtering the output signal to apply a control signal to the controllable circuit to control the magnitude of the signal provided thereby.

BRIEF DESCRIPTION OF THE DRAWING

The detailed description of the preferred embodiments of the present invention will be more easily and better understood when read in conjunction with the FIGURES of the Drawing which include:

FIG. 1 is a schematic block diagram of an exemplary embodiment of a receiver for receiving television signals in analog format and in digital format including an automatic gain control in accordance with the present invention;

FIGS. 2A and 2B are frequency spectrum diagrams for NTSC format television signals and for ATSC format television signals, respectively;

DESCRIPTION OF THE PREFERRED EMBODIMENT

Figure 3:
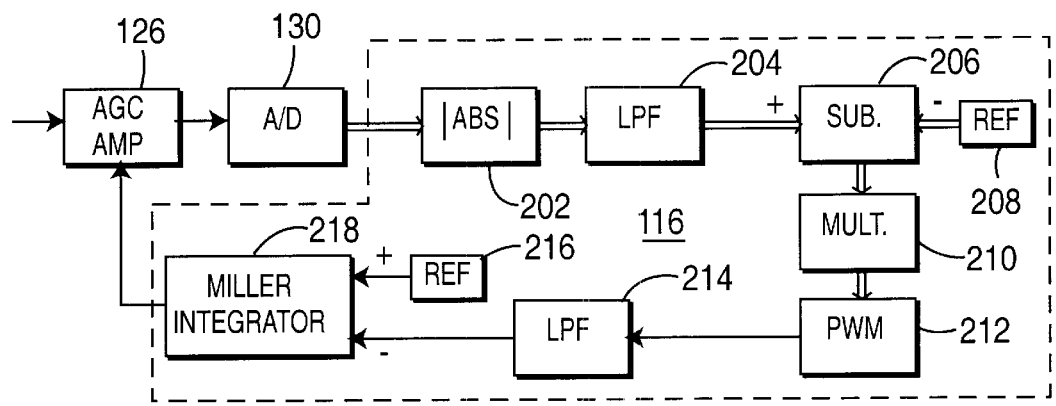
FIGS. 3 and 4 are schematic block diagrams of alternative embodiments of an automatic gain control in accordance with the present invention and that are useful in the receiver of FIG. 1.

FIG. 1 is a schematic block diagram of an exemplary receiver 100 for receiving television signals in analog format and in digital format and for displaying a television picture in response thereto. Receiver 100 includes an automatic gain control in accordance with the present invention. In the following description, signals including information in an analog format are exemplified by NTSC format signals and signals including information in a digital format are exemplified by ATSC format signals. FIG. 2A is a frequency spectrum diagram of an NTSC analog format television signal in which the analog luminance or picture signal is amplitude modulated onto a picture carrier (or visual carrier) which coincides with the RF carrier frequency when transmitted by broadcast, cable, satellite or other medium. The color content of the picture, also known as the chrominance or "chroma" signal, is modulated onto a chroma carrier that is at a frequency 3.58 MHZ higher in frequency than the picture carrier, and the audio program is frequency modulated onto a sound carrier that is at a frequency that is 4.5 MHZ higher in frequency than the picture carrier. It is noted that the modulated luminance signal has a portion of the lower sideband remaining that extends about 1.25 MHZ below the picture carrier frequency, and which must be filtered out in processing the NTSC signal in a receiver, and so only about 4 MHZ or less of the available bandwidth of 6 MHZ is utilized for luminance signal. After the NTSC format signal is down converted to the IF frequency, the picture carrier is at the frequency typically designated as the IF frequency, and the spectrum us "flipped" from that shown in FIG. 2A, i.e. the chroma and sound carriers are at frequencies 3.58 MHZ and 4.5 MHZ, respectively, lower than the IF frequency.

FIG. 2B is a frequency spectrum diagram of an ATSC digital format television signal in which the digitally coded and modulated television signal occupies 5.38 MHZ of the available 6 MHZ channel bandwidth. An ATSC pilot carrier inserted at the lower frequency band edge coincides with the RF carrier frequency when transmitted by broadcast, cable, satellite or other medium. All of the picture and sound program information is encoded in modulated sequences of digital data in the ATSC digital format, and so there are no separate chroma or sound carriers. The digital data formats, coding and signal processing schemes employed in the digital format television signals, while not necessary for understanding the present invention, are described, for example, in G. Sgrignoli et al, "VSB Modulation Used For Terrestrial and Cable Broadcasts," *IEEE Transactions on Consumer Electronics*, Vol. 41, No. 3, August 1995, pages 367–382.

Returning to FIG. 1, RF television signals received at antenna 110 (which may include a cable or satellite TV signal input as well as an air-wave broadcast signal input) are amplified and down converted to the IF frequency, typically about 44–45 MHZ, by RF tuner 112 whose gain is controlled to amplitude limit the RF signal in response to RF automatic gain control (AGC) detector 114. As is known, the gain of the RF amplifier(s) of tuner 112 is desired to be high to obtain the best signal-to-noise ratio, and so its gain is not reduced unless the incoming signal is so strong that operating the AGC of the following circuits to produce low IF gain is insufficient to reduce the final signal amplitude to the desired level. Tuner 112 includes a frequency synthesizer to generate the frequency signal that is mixed with the incoming RF signal for down conversion thereof to the IF frequency. The frequency synthesizer typically employs a crystal oscillator operating at about 4 MHZ and a phase-locked loop including a controllable frequency divider having its division ratio established in response to control signals received via a conventional I²C control data bus from a micro-controller. Band switching and filter tuning of tuner 112 is also controlled in response to the control signals received via the I²C control data bus. Tuners and tuner components are conventional and are available from many sources, for example, a type HFA3101 900 MHZ down converter available from Harris Semiconductor located in Melbourne, Fla., or types TDA9819/9829T IF down converters available from Philips Semiconductors located in Eindhoven, The Netherlands and Sunnyvale, Calif.

SAW filter 120 selects a bandwidth of the signal at the IF frequency, typically about a 6 MHZ bandwidth of the down-converted RF signal, whether the RF signal is an ATSC format signal or is an NTSC signal, which is applied to the input of IF amplifier 126. Suitable SAW filters are available from several sources, such as the 45.75 MHZ SAW filter types M4951M and M4952M available from Siemens Matsushita Components located in Germany and Japan. Suitable IF amplifiers are available from several sources, such as the type CA 7607 and CA7611 video IF amplifiers available from Harris Semiconductor located in Melbourne, Fla., and originally available from RCA Solid State, Somerville, N.J. Only a single SAW filter and a single IF amplifier are required in the IF section to filter and amplify the IF signal whether the IF signal includes information in a digital format or in an analog format, although additional SAW filters and IF amplifiers may be employed where a receiver is to receive more than one channel of television signal at the same time, for example, for a picture-in-the-picture ("pix-in-pix") feature.

The IF signal from IF amplifier 126 is then applied to an analog-to-digital (A/D) converter 130 which converts the analog IF signal into a digital signal, i.e. into a sequence of digital data values or digital words at the sampling frequency $f_s$ at which the A/D converter 130 is operated, which digital data values correspond to the amplitudes of the analog IF signal waveform at the times of sampling at the sampling frequency $f_s$. A/D converter 130 is typically a 10-bit A/D converter and may be a flash converter, a pipelined converter or a converter employing a combination of flash and pipeline processing. Suitable AD converters are available from several sources, such as the type ADS823 10-bit, 60 MHZ sampling A/D converter available from Burr-Brown Corporation located in Tucson, Ariz. or the type TDA8763 ADC available from Philips Semiconductors located in Eindhoven, The Netherlands and Sunnyvale, Calif.

When the IF frequency and the A/D converter 130 sampling frequency $f_s$ are properly selected, then the respective processing of the digital data words for analog format signals and for digital format signals is simplified, at least in that the same sampling frequency $f_s$ may be employed regardless of whether the signal is in analog format or digital format. The sampling nature of A/D converter 130 results in down conversion in frequency of the IF signal and the generation of replicas of the IF signal spectrum at the sum and differences of the IF and sampling frequencies. The sampling frequency $f_s$ is selected so that the frequency translated IF center frequency is greater than one half the desired signal bandwidth and so that the absolute value of the frequency translated IF center frequency is greater than the desired signal bandwidth. This avoids the introduction of aliasing signals into the sampled signal components that would not be removed by subsequent processing of the digital signal by NTSC and ATSC processing sections 140, 150.

For example, consider a case wherein the IF frequency bandwidth is selected to be centered at 44 MHZ, so that the NTSC picture carrier will be at 45.75 MHZ and the ATSC pilot carrier will be at 46.69 MHZ. If the sampling frequency $f_s$ of A/D converter 130 is selected to be 25 MHZ, then an NTSC processing section 140 that selects the first lower frequency image of the IF signal spectrum will receive a digital signal from A/D converter 130 having the NTSC picture carrier at 20.75 MHZ at which frequency it is conveniently filtered, as described below in relation to vestigial filter 142. In the same instance, an ATSC processing section 150 that selects the second lower frequency image of the IF signal spectrum will receive a digital signal having the ATSC pilot carrier at 3.31 MHZ which is convenient for the subsequent processing of ATSC format signals, for example, by an ATSC vestigial sideband (VSB) processor. This arrangement allows vestigial sideband filtering of the NTSC analog format signals and enables pilot carrier extraction for the ATSC digital format signals.

The digital signal generated by A/D converter 130 operating at a sampling frequency $f_s$ is applied to an NTSC processing section 140 that includes a digital vestigial sideband filter 142. A vestigial sideband filter 142 has a vestigial-sideband-filter characteristic to linearly attenuate the NTSC signal at frequencies near the picture carrier so as to remove the effect of the vestigial sideband that is on the opposite side of the picture carrier frequency. The vestigial sideband if not removed would erroneously increase the low frequency content of the NTSC luminance signal. Vestigial sideband filter 142 is implemented as an infinite impulse response (IIR) or a finite impulse response (FIR) digital filter comprising a delay line having a series of delay stages, weighting blocks to weight the signals at various taps along the delay line, and a summing block to combine the various weighted delayed signals.

The filtered digital NTSC signal is thereafter down converted to baseband by a digital down converter 144 from which it is processed conventionally by NTSC processor 146 to recover the digital luminance and chrominance signals that are, if an NTSC format signal is received, passed by control circuit 160 to be combined, formatted and displayed by display 170, such as a cathode ray tube, plasma display, LCD panel or other display device. Suitable down converters include, for example, the type HSP50016 digital down converter available from Harris Semiconductor located in Melbourne, Fla. Suitable NTSC processors include, for example, type SAA7111 video input processor available from Philips Semiconductors located in Eindhoven, The Netherlands and Sunnyvale, Calif.

In addition, the digital signal generated by A/D converter 130 operating at a sampling frequency $f_s$ is applied to an ATSC processing section 150 that includes a vestigial sideband (VSB) processor 152. VSB processor 152 demodulates the digital data words to produce at baseband the encoded stream of digital values transmitted by the originating station including the synchronization and timing signals associated therewith. The digital data words from VSB processor 152 are applied to ATSC processor which decodes the picture information therefrom, typically in the standard MPEG-2 format. If an ATSC format signal is received, the MPEG-2 digital data stream from ATSC processor 154 is passed by control circuit 160 to be decoded from MPEG-2 format, combined, formatted and displayed by display 170, such as a cathode ray tube, plasma display, LCD panel or other display device. Suitable VSB and ATSC processors include types MCT 2100 and MCT 4000 available from Motorola Semiconductor located in Scottsdale, Ariz., and type TDA8960 available from Philips Semiconductors located in Eindhoven, The Netherlands and Sunnyvale, Calif.

The digitized IF signal from A/D converter 130 is also applied to a digital automatic gain control (AGC) detector 116, as shown in FIG. 1, for gain-controlling IF amplifier 126, and in conjunction with RF AGC detector 114, controlling the gain of tuner 112. It is noted that IF AGC detector 116 and RF AGC detector 114 cooperate to apportion the total available gain between the amplifiers in tuner 112 and IF amplifier 126 so as to maintain high signal-to-noise ratio when signals of moderate to weak strength are received and to avoid signal distortion when signals of high strength are received. Preferably, the gain apportionment tends to operate tuner 112 at high gain, typically at or near maximum gain to maximize the signal relative to the noise, and to utilize control of the gain of IF amplifier 126 to control the amplitude of the signal at A/D converter 130. Only when the gain of IF amplifier 126 has been reduced to a low value does RF AGC detector 114 then reduce the gain of tuner 112, as would be the case when a very strong signal is being received. Conventional processors, such as the RCA-CA3154E integrated circuit TV Sync/AGC/Horizontal Signal Processor described in *RCA Integrated Circuits for Linear Applications*, Data Book SSD-240C, 1986, File Number 1186, pages 868–873, employ similar gain apportionment and further accommodate both forward and reverse sense tuner AGC characteristics, i.e. tuners that have gain that is related directly to the AGC control signal magnitude and tuners that have gain that is related inversely to the AGC control signal magnitude, respectively.

Figure 4:
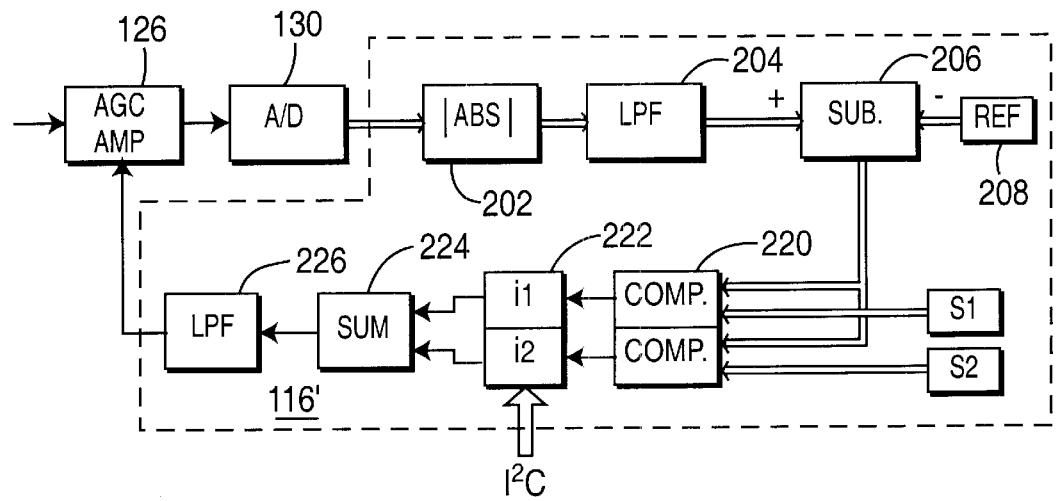

FIGS. 3 and 4 are schematic block diagrams of alternative exemplary embodiments of a digital automatic gain control 116 in accordance with the present invention that is useful, for example, in the receiver 100 of FIG. 1 to provide AGC to IF amplifier 126 thereof. The sequence of digital data words produced at the output of A/D converter 130 represents the amplitude of the signal at the output of IF amplifier 126 to which an AGC control signal is to be applied. With regard to FIG. 3, the digital data words are first stripped of their sign (i.e. polarity) by absolute value circuit 202 the output of which is the sequence of digital data words of all the same sign, e.g., all are positive amplitude values. These digital data words are low-pass filtered by digital low pass filter 204, which may be of the IIR or the FIR type, to produce a representation of the average of the amplitude values. Reference source 208 provides a digital reference value against which each of the digital data words are compared, such as by a digital subtractor 206. The sequence of data words produced by subtractor 206 is an error signal that represents in sign and magnitude the difference between the actual average amplitude of the digital data words generated by A/D converter 130 and the desired value thereof as represented by the reference value of reference source 208, which is directly related to the difference between the average amplitude of the signals at the output of IF amplifier 126 and the desired amplitude thereof. Given the negative feedback sense of the AGC loop including AGC amplifier 126, A/D converter 130 and AGC detector 116, the error signal at the output of subtractor 206 tends to be driven towards a value of zero.

The gain of the AGC function is increased by amplifying the error signal from subtractor 206 by a gain factor, as may be realized by a digital multiplier 210 that multiplies the input value (multiplicand) received by the gain factor (multiplier). The product thereof is applied to a pulse width modulator (PWM) 212 that converts the digital value of the product to a pulse duty cycle (i.e. the ratio of the time the PWM output signal is at a high level to the time it is at both the high and low levels in a given cycle). The output of PWM 212 can vary between 0% and 100% duty cycle, i.e. between always being at the low level (e.g., 0 volts) and always being at the high level (e.g., +5 volts). At any duty cycle between 0% and 100%, the output of PWM 212 alternates between the high and low levels and so has an average value that represents the amplified error signal, but also has a sequence of transitions that have a high AC content as well. Analog low-pass filter 214 reduces the AC content caused by the PWM transitions so that only an acceptably small AC ripple signal remains on the amplified error signal. This ripple signal is further attenuated while the amplified DC error signal is further amplified by a Miller integrator 218 that exhibits an extremely high gain at DC, e.g., 50 dB, and a very long time constant, e.g., 0.1 seconds. The signal level from Miller integrator 218 is applied to the gain control input of IF amplifier 126 to control the gain thereof. Preferably, the ripple content of the AGC signal produced by Miller integrator 218 is very low so as not to modulate the gain of IF amplifier 126, which modulation would introduce amplitude modulation of the IF signal and modulation products in the signals demodulated therefrom.

Miller integrator 218 also receives a reference signal from reference source 216 for setting its operating center level. If a single polarity voltage supply Vdd is utilized, then reference source 216 provides a potential of about Vdd/2. Thus, the reference source 216 value preferably is centered between the values of the most positive supply potential and of the most negative supply potential, e.g., between +Vdd volts and zero volts. If both positive and negative polarity voltage supplies are utilized, then reference source 216 provides a potential of about zero volts, or ground potential. Thus, reference source 216 may be implemented as a resistive voltage divider or, with both polarity voltage supplies, as a connection to ground.

Where A/D converter 130 is a twos-complement 10-bit converter, its output data words are in twos-complement format and have values between −512 and +511 and so the outputs from absolute value circuit 202 and low pass filter 204 have values between 0 and +511. If the value of reference 208 is at the center value, i.e. about 255, then the range of outputs produced by subtractor 206 is between −255 and +256, and is symmetrical in that the maximum values of the positive error value and of the negative error value are about the same.

It is noted that the function of absolute value circuit 202 is to operate on the digital data words produced by A/D converter 130 to obtain amplitude or magnitude (value) information without regard to sign or polarity. If the digital data words from A/D converter 130 are in binary format with a sign bit, i.e. are in sign-magnitude representation, then absolute value circuit 202 operates on the digital data words by merely removing the sign bit. If the digital data words from A/D converter 130 are in twos-complement representation, then absolute value circuit 202 operates on the digital data words by passing the positive-valued data words (which have a zero in the left-most bit position) without change and by complementing (inverting) each of the bits of the negative-valued data words (which have a one in the left-most bit position) and adding the value one thereto. Although absolute value circuit 202 preferably performs the operation to obtain the absolute value of each incoming digital data word in the sequence of digital data words generated by A/D converter 130, such detail is not necessary. Note that the sample rate of A/D converter 130 is high as compared to the rate at which the amplitude of the signal received at tuner 112 usually changes, which changes are the principal changes that affect the amplitude of the signal at the output of IF amplifier 126 and the digital representation thereof produced by A/D converter 130. As a result, the bandwidth of the AGC control 116 can be low and so it is satisfactory, for example, to merely pass those digital data words having a particular sign and to block the digital data words of the other sign where sufficient samples are available to control AGC. While an absolute value circuit 202 is preferred, any circuit 202 that produces a representation of the amplitude or magnitude of the digital data generated by A/D converter 130 is satisfactory, and circuit 202 is followed by low-pass filter 204 to produce a representation of the average value of the amplitude.

It is preferred that the "gain" from the output of subtractor 206 to the input to Miller integrator 218, e.g., the millivolts change per unit of digital error value change, be high so as to minimize the offset error and/or drift introduced by any inaccuracy in and any change of reference source 216. If, however, the value of reference source 208 is not centered, then the range of output values produced by subtractor 206 becomes asymmetrical. For example, if the reference 208 value is 130, then the range of subtractor 206 is from −130 to +381, and the ability of PWM 212 and Miller integrator 218 to slew the AGC signal to amplifier 126 will likewise be asymmetrical. Thus, the slew rate of the AGC signal available to be applied to amplifier 126 will vary depending upon the value of reference source 208 and will likely be asymmetrical.

In the AGC detector 116' of FIG. 4, AGC amplifier 126, A/D converter 130, absolute value circuit 202, low-pass filter 204 subtractor 206 and reference source 208 are and operate as described above in relation to FIG. 3. As above, the negative feedback sense of the AGC loop including AGC amplifier 126, A/D converter 130 and AGC detector 116', tends to drive the error signal at the output of subtractor 206 towards a value of zero. The error value output produced by subtractor 206 is applied to comparator 220 for controlling controllable current source 222. Although comparator 220 may be a simple two-input comparator and current source 222 may be a simple two-level current generator, a more complex and preferred arrangement is shown and described. If comparator 220 detects an error signal of a first polarity it controls current source 222 to produce a current of a first polarity to increase the signal at summer 224, which may be a capacitor or a capacitor and a resistor. If comparator 220 detects an error signal of the opposite polarity it controls current source 222 to produce a current of the opposite polarity to decrease the signal at summer 224. The signal level of summer 224 is low-pass filtered to reduce any ripple thereon by low-pass filter 226 and is applied to the gain control input of IF amplifier 126 to control the gain thereof.

Figure 5:
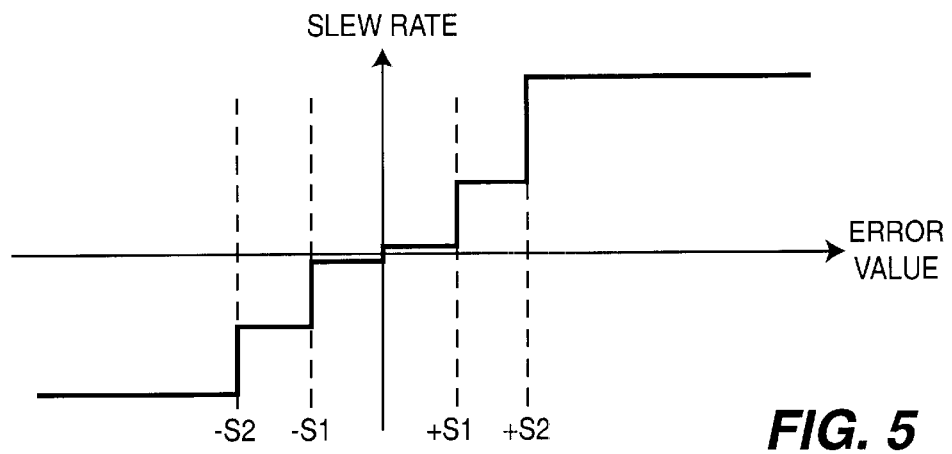
FIG. 5 is a graphical representation of a slew rate characteristic of the embodiment of FIG. 4.

Preferably, comparator 220 is responsive not only to the polarity of the error value from subtractor 206, but is also responsive to the magnitude thereof for reducing the magnitude of the ripple signal generated at summer 224 and for increasing the slew rate of the signal generated at summer 224. To this end, comparator receives at least one digital reference or threshold value S1, and preferably two digital reference or threshold values S1, S2, against which the digital error value from subtractor 206 is compared. If the magnitude of the error value from subtractor 206 is less than the threshold value S1, comparator 220 controls current source 222 to produce a low magnitude current i1 of a polarity corresponding to the polarity of the error value. This is typically the condition where the AGC level is at the desired level and the level of ripple signal at summing element (summer) 224 is low. If the magnitude of the error value from subtractor 206 is greater than the threshold value S1 and less than the threshold value S2, comparator 220 controls current source 222 to produce a current i1 of greater magnitude and of a polarity corresponding to the polarity of the error value, so that the rate of change of signal at summer 224 is increased and the slew rate of AGC detector 116' is likewise increased. If the magnitude of the error value from subtractor 206 is also greater than the threshold value S2, comparator 220 controls current source 222 to also produce an additional current i2 of a polarity corresponding to the polarity of the error value, so that the rate of change of signal at summer 224 is further increased and the slew rate of AGC detector 116' is likewise further increased. Thus, the rate of change of the signal at summer 224 is low when the error value is less than the value S1 so as to produce low signal ripple into filter 226, and a high slew rate obtains when the error value exceeds the value of S1 and a higher yet slew rate obtains when the error value exceeds the value of S2. The advantage of the arrangement of FIG. 4 is not only that the slew rate at summer 224 increases as the magnitude of the error increases, but that the slew rate is symmetrical and is also controllable in relation to the magnitude of the error value, as is illustrated in FIG. 5.

It is noted that the magnitude or polarity, or both, of the one or more analog currents generated by current source 222 is responsive to the relative magnitudes and polarities between the digital error value from subtractor 206 and the digital reference values S1, as is the output signal generated at summer 224 and filtered by low-pass filter 226 of gain control 116'.

Again, where A/D converter 130 is a twos-complement 10-bit converter, its output data words have values between −512 and +511 and so the outputs from absolute value circuit 202 and low pass filter 204 have values between 0 and +511. If the value of reference 208 is at the center value, i.e. about 255, then the range of outputs produced by subtractor 206 is between −255 and +256, and is symmetrical. If, however, the value of reference source 208 is not centered, then the range of output values produced by subtractor becomes asymmetrical. For example, if the reference 208 value is 130, then the range of subtractor 206 is from −130 to +381. If, however, the value of S1 is ±3 and the value of S2 is ±7, for example, the ability of comparator 220, current sources 222, summer 224 and filter 226 to slew the AGC signal to amplifier 126 will continue to be symmetrical. Thus, the slew rate of the AGC signal will vary depending upon the value of the error signal in relation to the threshold values S1, S2, for example, larger error values will produce a greater slew rate and thus a faster correction. In addition, the slew rate performance is symmetrical.

In addition, the magnitude of the slew rate may be controllable in response to control values received via the standard I²C control bus from a micro controller for controlling the magnitudes of the currents generated by current source 222 in response to comparator 220. In fact, the threshold values S1, S2 and the value of reference 208 may also be adjusted in response to control values received via the I²C control bus. One way in which the threshold values S1, S2 and the value of reference 208 may be controlled is to adjust the values thereof differently when the signals received are of the analog format type than when they are of the digital format type.

Figure 6:
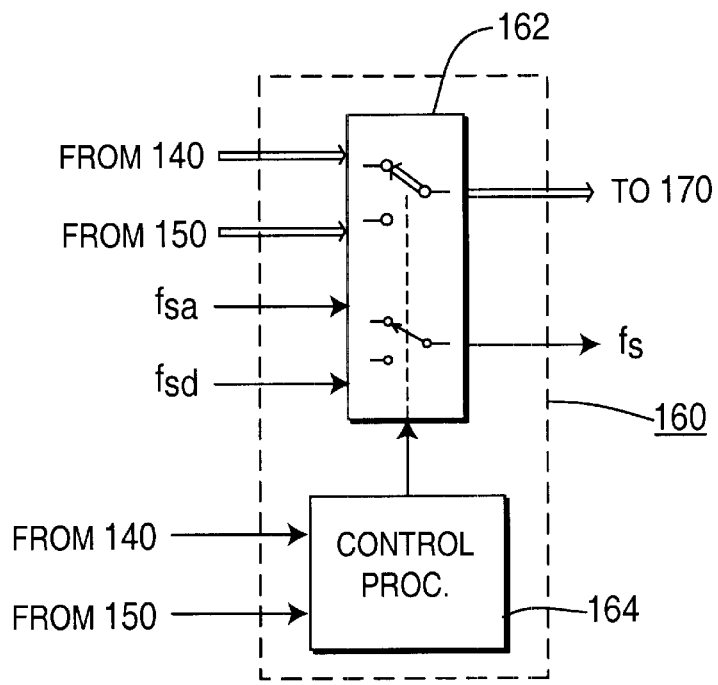
FIG. 6 is a schematic block diagram of an exemplary control circuit useful in the embodiment of FIG. 1.

FIG. 6 is a schematic block diagram of an exemplary control circuit 160 useful in the embodiment of FIG. 1. Control circuit 160 includes a switch or multiplexer 162 that operates as a two-to-one switch to pass processed digital data generated by NTSC section 140 from NTSC format received signals when NTSC format signals are received and to pass processed digital data generated by ATSC section 150 from ATSC format received signals when ATSC format signals are received. In fact each of the two-to-one switches includes a number of parallel paths or channels equal to the number of bits in the digital data to be passed, typically 8-bit-wide paths for 8-bit digital data words. Switch 162 is controlled to select NTSC or ATSC digital data by control processor 164 which is responsive to control inputs from NTSC section 140 and ATSC section 150 applied thereto. Control circuit 160 is responsive either directly or indirectly to the IF signals for selecting the appropriate one of the analog section 140 and digital section 150 outputs. Control circuit 160 may be responsive, for example, to the IF signal produced by IF amplifier 126, or to the digital representation thereof produced by A/D converter 130, or to a processed signal responsive thereto such as the digital data from vestigial filter 142 and/or VSB processor 152.

In particular, switching of control circuit 160 is responsive to respective data signals generated by each of NTSC section 140 and ATSC section 150 indicating the presence of proper NTSC and proper ATSC formatted signals, respectively. In a basic form, control processor 164 is simply responsive to outputs from carrier detector 148 and/or from pilot detector 156. Visual carrier detector 148 of NTSC section 140 generates a carrier-present signal when digitized NTSC format signals are applied to vestigial sideband filter 142. Similarly, pilot detector 156 of ATSC section 150 generates a carrier-present signal when digitized ATSC format signals are applied to VSB processor 152. Carrier detector 148 and pilot detector 156 can be implemented as phase locked loops that only lock to the carrier signal or pilot signal to be detected or may be implemented in other ways.

Control circuit 160 may also include a second switching function within switch 162 where it is desired that A/D converter 130 operate at different sampling frequencies as a function of the format of the received signals. A first sampling frequency signal $f_{sa}$ is provided through switch 162 as sampling signal $f_s$ when signals in the analog signal format are received and a second sampling frequency signal $f_{sd}$ is provided as sampling signal $f_s$ when signals in the digital signal format are received. The sources of the sampling frequency signals are conventional.

Figure 7A:
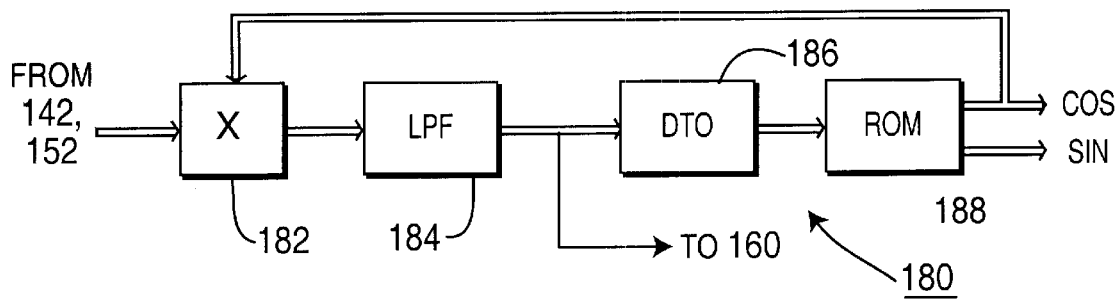
FIGS. 7A and 7B are schematic block diagrams of two alternative exemplary embodiments of carrier and pilot tone detectors useful with the embodiment of FIG. 1.

FIG. 7A is a schematic block diagram of an exemplary embodiment of a digital detector 180 that may be utilized for carrier detector 148 or pilot detector 156. Detector 180 employs a digital phase-locked loop (PLL). Multiplier 182 which serves as the phase detector of the phase-locked loop receives the digital data words representing the input signal at one input and the PLL output frequency, nominally that of the NTSC picture carrier frequency in the case of detector 148 and that of the ATSC pilot carrier in the case of detector 156, at the other input thereof. The PLL output frequency may be the cosine signal output, the sine signal output, a squarewave signal output or other convenient form. If the input data words are of the proper signal type, i.e. of the NTSC or of the ATSC format signals, as the case may be, then multiplier 182 generates an output that is filtered by digital low-pass loop filter 184 and is indicative of the presence or absence of the input signal carrier being sought. Alternatively, an in-phase detector including a digital low-pass filter preceded by a second multiplier having as its inputs the data words from 142, 152 and the sine output from ROM 188 can be employed to provide a positive value signal to control circuit 160. The output from loop filter 184 controls discrete time oscillator (DTO) 186, the input of which represents the ratio of the desired output frequency and its clock frequency, i.e. unity when the clock frequency is that of the carrier to be detected and the carrier to be detected is present. The output of DTO 186 is applied to read only memory 198 which contains a look-up table of the values of the sine and cosine values of the DTO 186 output, and the PLL output signal is applied to multiplier 182 to complete the PLL.

Figure 7B:
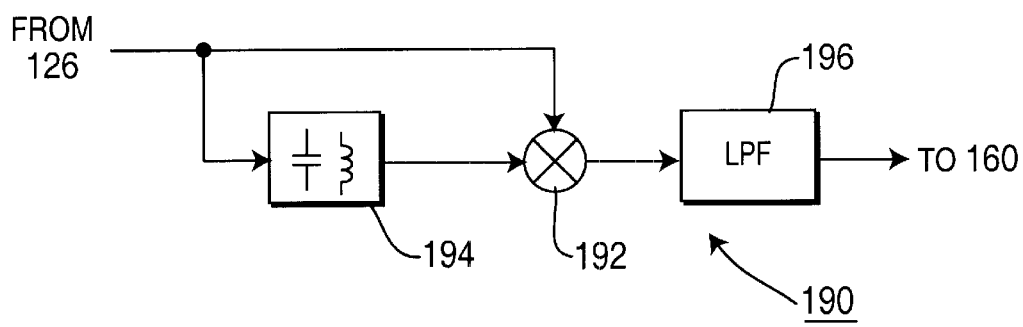

FIG. 7B is a schematic block diagram of an exemplary embodiment of an analog detector 190 that may be utilized for carrier detector 148 or pilot detector 156. Detector 190 is of the sort known as an "exalted carrier" detector. An analog input signal from IF amplifier 126 including a carrier signal (or a pilot signal, as the case may be) is applied directly to a first input of a mixer 192 and is filtered and applied also to the second input of the mixer 192. In particular, narrow-band tuned filter 194 exhibits a narrow passband response at the nominal frequency of the signal to be detected, for example, at the picture carrier frequency in the case of NTSC carrier detector 148 and at the pilot frequency in the case of ATSC pilot detector 156. Only if the proper input signal is present will narrowband filter 194 apply any signal to mixer 192, in which case the output signal from mixer 192 when filtered by low-pass filter 196 will be a high level that can be acted upon by control circuit 160 as an indication of the presence of the carrier signal or the pilot carrier, as the case may be. When a proper input signal is absent, filter 194 produces no output and so neither does mixer 192 and low pass filter 196, and control circuit 160 receives a low-level signal indicating absence of the carrier signal or the pilot carrier, as the case may be.

Because receiver 100 will receive either an NTSC format signal or an ATSC format signal or no signal, only one of detectors 148 and 156 will provide a carrier-present signal at any time, thereby to uniquely and correctly actuate control circuit 160. If neither an NTSC nor an ATSC format signal is received, neither carrier detector 148 nor pilot detector 156 produces a carrier-present signal and control circuit 160 takes a default state. The default state may be to close the switch 162 to select the NTSC signal path, or to close the switch 162 to select the ATSC signal path, as convenient, or perhaps opening both the NTSC and the ATSC paths so that a blank display or other predetermined display results. It may be convenient to select the default condition of control circuit 160 depending upon whether NTSC or ATSC signal transmissions predominate at the time of manufacture of the receiver, or to provide a user-selectable default condition such as by a simple switch or through a programming feature. Alternatively, the default condition could be to select a predetermined one of the NTSC or of the ATSC signal path, or to select the last-received signal. Further, only one detector need be employed to detect the presence of one of the NTSC or ATSC format signals and actuate control circuit 160.

Advantages of the foregoing arrangement include that the receiver automatically adapts to the particular format of the signal being received, whether that be in an analog format or in a digital format. This is especially desirable where a broadcaster may be transmitting in an analog format at certain times and in a digital format at other times, or when a particular program source changes over from an analog format to a digital format. In addition, when a receiver is programmed by operation in a search mode, as is the case when a new receiver is first operated or when a receiver is reprogrammed after a power outage, the analog format and digital format detections made during the search mode can be stored to later set up the proper format for each channel when that channel is selected by the user.

While the present invention has been described in terms of the foregoing exemplary embodiments, variations within the scope and spirit of the present invention as defined by the claims following will be apparent to those skilled in the art. For example, although a receiver including an AGC arrangement according to the present invention may require only a single RF tuner, IF filter and IF amplifier, it is contemplated that one or more additional RF tuners, additional SAW filters and/or IF amplifiers may be employed where certain features, such as picture-in-picture, are desired. In such case, additional or modified AGC apparatus according to the present invention may be employed in conjunction therewith. Further, while the exemplary gain-controllable circuit with which the AGC according to the present invention operates is described in terms of an amplifier, it may be any controllable scaling circuit or controllable attenuator, be active or passive, be linear or logarithmic or otherwise non-linear, be inverting or non-inverting, and may exhibit positive or negative gain, or positive or negative attenuation, or both. Further, an absolute value circuit may be any circuit operating to provide the magnitude of a signal irrespective of the sign or polarity thereof.

Similarly, although a receiver including the present invention requires only a single A/D converter for converting both NTSC and ATSC format signals, it may be convenient to utilize two A/D converters, for example, as where the NTSC section 140 and the ATSC section 150 are each available as an integrated circuit that includes an A/D converter. In such case, separate AGC apparatus may be provided for each of sections 140, 150, or a single AGC apparatus receiving input digital data words selected, as by a digital switch, from the appropriate selected one of the two A/D converters may be employed.

Moreover, in the AGC detector of FIG. 4, for example, the value of the current i1 could be zero, in which case the AGC detector loop would operate in a limit cycle or "bang-bang" servo manner. Further, the threshold values S1, S2 could be other than symmetrical values for positive and negative error senses. Additional threshold values S3, S4 and so forth could also be employed to generate additional levels of currents i3, i4 and so forth. Further, the controllable sources of analog current could be replaced by sources of analog voltage, if desired.

In addition, the carrier detectors 148, 156 may operate responsive to carriers other than the picture carrier and the pilot carrier, such as the chroma carrier, the sound carrier, or various synchronization signals that are unique to the type of signal, NTSC or ATSC, to be detected. Moreover, the carrier detectors need not receive input signals from the vestigial sideband filter or the VSB processor, but may receive signals from ahead of or after such filter and/or processor. The carrier detectors may also operate in direct response to the IF signal rather than to signals derived therefrom, and may be implemented in either analog or digital circuitry. Suitable filters for the IF filter 120 include the preferred SAW filters and tuned L-C filters.

What is claimed is:

1. A gain control for a gain-controllable circuit comprising:
    means for converting an output signal from the gain-controllable circuit into digital data;
    a first digital comparator comparing a representation of the magnitude value of the digital data to a digital reference value to produce a digital error value;
    a generator of an output signal responsive to the digital error value; and
    a low-pass filter responsive to the output signal to apply a gain control signal to said gain-controllable circuit,
    wherein said generator comprises a pulse width modulator responsive to the digital error value and a second low-pass filter coupled thereto to provide the output signal.

2. The gain control of claim 1 further comprising a digital absolute value generator and a low-pass filter responsive to said digital data to produce the representation of the magnitude value thereof.

3. The gain control of claim 1 wherein said means for converting includes an analog-to-digital converter.

4. The gain control of claim 1 wherein said low-pass filter includes a Miller integrator.

5. The gain control of claim 1 wherein said gain-controllable circuit includes at least one of a gain-controllable amplifier and a controllable attenuator.

6. The gain control of claim 5, wherein said gain-controllable amplifier is an IF amplifier as for a television receiver.

7. A gain control for a gain-controllable circuit comprising:
- means for converting an output signal from the gain-controllable circuit into digital data;
- a first digital comparator comparing a representation of the magnitude value of the digital data to a digital reference value to produce a digital error value;
- a generator of an output signal responsive to the digital error value; and
- a low-pass filter responsive to the output signal to apply a gain control signal to said gain-controllable circuit,
- wherein said generator comprises at least one digital value comparator comparing the digital error value to a second digital reference value to produce said output signal.

8. The gain control of claim 7 wherein said output signal is responsive to a current having a value responsive to said digital value comparator.

9. The gain control of claim 8 wherein the value of said current is responsive in one of magnitude, polarity, and magnitude and polarity, to the relative values between the digital error value and the second digital reference value.

10. The gain control of claim 7 wherein said output signal includes the sum of plural currents each having a value responsive to said digital value comparator.

11. The gain control of claim 10 wherein the value of each said plural currents is responsive in one of magnitude, polarity, and magnitude and polarity, to the relative values between the digital error value and a respective one of the second digital reference value and a third digital reference value.

12. The gain control of claim 7 wherein said gain-controllable circuit includes at least one of a gain-controllable amplifier and a controllable attenuator.

13. The gain control of claim 7 further comprising a digital absolute value generator and a low-pass filter responsive to said digital data to produce the representation of the magnitude value thereof.

14. A source of a controllable magnitude signal comprising:
- a source of a controllable amplitude analog signal;
- an analog-to-digital converter coupled to said source for converting the analog signal into a sequence of digital words;
- a first digital comparator comparing a representation of the magnitude value of the digital words to a digital reference value to produce a digital error value;
- a generator of an output signal responsive to the digital error value;
- a low-pass filter responsive to the output signal to apply a control signal to said source to control the amplitude of said analog signal; and
- utilization means coupled to at least one of said source and said analog-to-digital converter for utilizing at least a corresponding one of said analog signal and said sequence of digital words,
- wherein said generator comprises a pulse width modulator responsive to the digital error value and a second low-pass filter coupled thereto to provide the output signal.

15. The source of claim 14 further comprising a digital absolute value generator and a low-pass filter responsive to the digital words to produce the representation of the magnitude value thereof.

16. The source of claim 14 wherein said low-pass filter includes a Miller integrator.

17. The source of claim 14 wherein the analog signal is a television signal including information in at least one of an analog format selected from the group consisting of NTSC, PAL and SECAM, and a digital format selected from the group consisting of ATSC and DVB.

18. A source of a controllable magnitude signal comprising:
- a source of a controllable amplitude analog signal;
- an analog-to-digital converter coupled to said source for converting the analog signal into a sequence of digital words;
- a first digital comparator comparing a representation of the magnitude value of the digital words to a digital reference value to produce a digital error value;
- a generator of an output signal responsive to the digital error value;
- a low-pass filter responsive to the output signal to apply a control signal to said source to control the amplitude of said analog signal; and
- utilization means coupled to at least one of said source and said analog-to-digital converter for utilizing at least a corresponding one of said analog signal and said sequence of digital words,
- wherein said generator comprises at least one digital value comparator comparing the digital error value to a second digital reference value to produce said output signal.

19. The source of claim 18 wherein said output signal includes an analog current having a value responsive to said digital value comparator.

20. The source of claim 19 wherein the value of said analog current is responsive in one of magnitude, polarity, and magnitude and polarity, to the relative values between the digital error value and the second digital reference value.

21. The source of claim 18 wherein said output signal is responsive to the sum of plural analog currents each having a value responsive to said digital value comparator.

22. The source of claim 21 wherein the value of each said plural analog currents is responsive in one of magnitude, polarity, and magnitude and polarity, to the relative values between the digital error value and a respective one of the second digital reference value and a third digital reference value.

23. The source of claim 18 further comprising a digital absolute value generator and a low-pass filter responsive to the digital words to produce the representation of the magnitude value thereof.

24. The source of claim 18 wherein the analog signal is a television signal including information in at least one of an analog format selected from the group consisting of NTSC, PAL and SECAM, and a digital format selected from the group consisting of ATSC and DVB.

25. A television receiver comprising:
- a tuner for converting input television signals to IF signals;
- a gain-controllable IF amplifier coupled to said tuner for amplifying the IF signals in a passband;

an analog-to-digital converter coupled to the IF amplifier for converting the amplified IF signals into a sequence of digital words;

a digital gain control responsive to the sequence of digital words and coupled to said gain-controllable IF amplifier for controlling the gain thereof, said digital gain control comprising:

a first digital comparator comparing a representation of the amplitude of the digital words to a digital reference value to produce a digital error value;

a generator of an analog signal responsive to the digital error value; and a low-pass filter responsive to the analog signal to apply a gain control signal to said gain-controllable IF amplifier;

a signal processor for producing picture information responsive to the sequence of digital words; and a display receiving the picture information from said signal processor, wherein the input television signals may include information in either one of an analog television signal format and a digital television signal format, wherein said signal processor includes:

a first processor for processing the IF signals that are in the analog television signal format;

a second processor for processing the IF signals that are in the digital television signal format; and a controllable switch for coupling picture information from a selected one of said first processor and said second processor to said display.

26. The television receiver of claim 25 further comprising a digital absolute value generator and a low-pass filter responsive to the digital words to produce the representation of the amplitude thereof.

27. The television receiver of claim 25 wherein the analog television signal format is selected from the group consisting of NTSC, PAL and SECAM, and wherein the digital television signal format is selected from the group consisting of ATSC and DVB.

28. A method of controlling the magnitude of a signal provided by a controllable circuit comprising:

converting the signal magnitude to a sequence of digital words;

comparing a representation of the magnitude value of the digital words to a digital reference value to provide a digital error value;

generating an output signal responsive to the digital error value; and filtering the output signal to apply a control signal to the controllable circuit to control the magnitude of the signal provided thereby, wherein said generating includes generating a pulse width modulated signal responsive to the digital error value and filtering the pulse width modulated signal to provide the output signal.

29. The method of claim 28 further comprising generating the digital absolute value of the digital words and low-pass filtering the absolute value of the digital words to produce the representation of the magnitude value thereof.

30. A method of controlling the magnitude of a signal provided by a controllable circuit comprising:

converting the signal magnitude to a sequence of digital words;

comparing a representation of the magnitude value of the digital words to a digital reference value to provide a digital error value;

generating an output signal responsive to the digital error value; and filtering the output signal to apply a control signal to the controllable circuit to control the magnitude of the signal provided thereby, wherein said generating includes comparing the digital error value to at least one further digital reference value, and generating at least one analog current having at least one of its magnitude and polarity responsive to the relative values between the digital error value and the at least one further digital reference value.

31. The method of claim 30 further comprising generating the digital absolute value of the digital words and low-pass filtering the absolute value of the digital words to produce the representation of the magnitude value thereof.

* * * * *